United States Patent [19]
Lorenzen

[11] Patent Number: 5,718,560
[45] Date of Patent: Feb. 17, 1998

[54] TURBOCOMPRESSOR FOR NON-IDEAL PROCESS GASES

[75] Inventor: Heinrich Lorenzen, Untersiggenthal, Switzerland

[73] Assignee: Sulzer Turbo AG, Zurich, Switzerland

[21] Appl. No.: 597,782

[22] Filed: Feb. 7, 1996

[30] Foreign Application Priority Data

Dec. 29, 1995 [EP] European Pat. Off. .............. 95810823

[51] Int. Cl.$^6$ .............................. F01D 11/00; F16J 15/34
[52] U.S. Cl. .............. 415/47; 415/111; 415/112; 415/113; 415/168.2; 415/175; 415/178; 415/230; 415/231; 277/2; 277/22; 277/28; 277/65
[58] Field of Search .................. 415/112, 113, 415/168.2, 178, 47, 111, 175, 176, 177, 230, 231; 277/2, 16, 22, 28, 65

[56] References Cited

U.S. PATENT DOCUMENTS

| | | | |
|---|---|---|---|
| 3,539,270 | 11/1970 | Derrickson | 415/231 |
| 4,360,207 | 11/1982 | Rappange et al. | 277/22 |
| 4,373,858 | 2/1983 | Eastman | 415/113 |
| 4,420,161 | 12/1983 | Miller | 415/230 |
| 4,872,689 | 10/1989 | Drumm | |
| 5,344,160 | 9/1994 | Scarlata et al. | 415/168.2 |
| 5,454,689 | 10/1995 | Falavigna | 415/112 |

FOREIGN PATENT DOCUMENTS

| | | | |
|---|---|---|---|
| 0 654 607 | 5/1995 | European Pat. Off. . | |
| 33 19041 | 11/1984 | Germany . | |
| 45 25 642 | 7/1993 | Germany . | |
| 0190603 | 9/1985 | Japan | 415/168.2 |
| 0230600 | 11/1985 | Japan | 415/168.2 |
| 0576463 | 11/1977 | U.S.S.R. | 277/28 |

*Primary Examiner*—Christopher Verdier
*Attorney, Agent, or Firm*—Townsend and Townsend and Crew LLP

[57] ABSTRACT

An arrangement for a dry-gas sliding ring seal in a turbomachine which establishes ambient conditions in the region of the dry-gas sliding ring seals under which no fluid precipitates regardless of whether the machine is operating or not. By supplying heat to the leakage flow during standstill of the turbomachine in a manner similar to that during its operation, an undercooling in the region of the dry-gas sliding ring seal with all its negative effects can be suppressed; and the start-up of the turbomachine takes place starting from a substantially safer operating state.

9 Claims, 3 Drawing Sheets

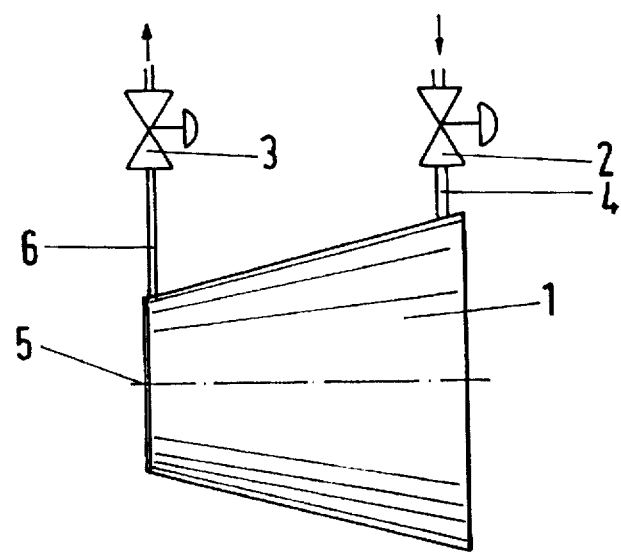
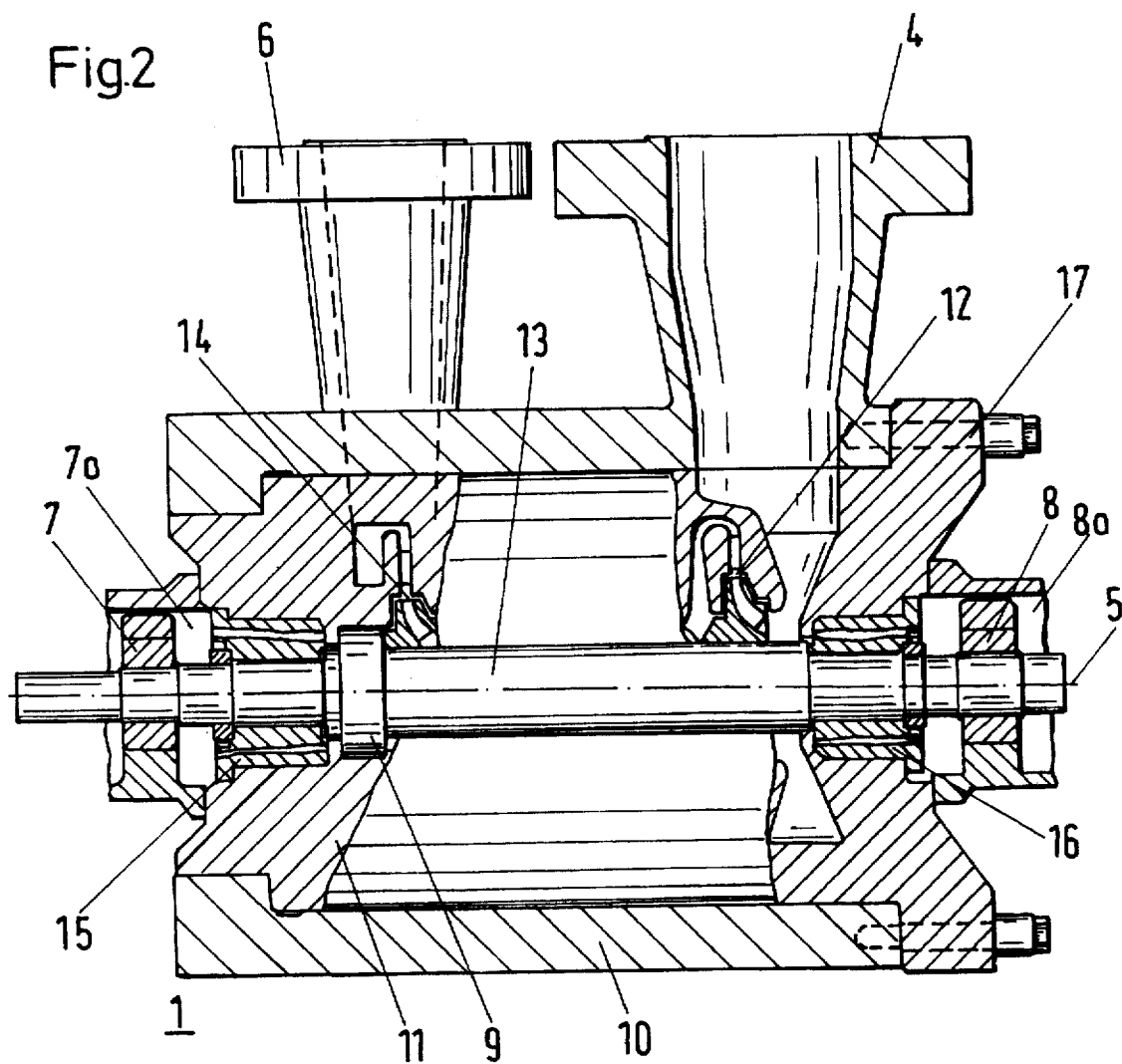

TURBOCOMPRESSOR FOR NON-IDEAL PROCESS GASES

BACKGROUND OF THE INVENTION

The invention relates to a turbomachine for non-ideal process gases, in particular turbocompressors, with a housing and with a rotor which is sealed off from the housing via dry-gas sliding ring seals in order to keep the leakage flow of process gas into the atmosphere small.

Dry-gas sliding ring seals and their use in turbomachines are described in published German patent application DE-A-39 42 408. Such dry-gas sliding ring seals are used for example in turbocompressors for natural gas production on oil platforms and in refineries, where system pressures of more than a hundred bars with respect to the atmosphere can arise. The dry-gas sliding ring seals have the advantage of keeping the leakage flow small, yet they are also highly stressed, sensitive parts, the failure of which requires a shutdown of the turbocompressor. This means that the availability of a turbocompressor can only be as good as that of its dry-gas sliding ring seals.

SUMMARY OF THE INVENTION

It is an object of the present invention to prevent operating conditions at the dry-gas sliding ring seals which lead to dropout of the seals and the turbomachine. This object is satisfied by a heating device which acts on the leakage flow which is installed at the dry-gas sliding ring seal and prevents an inadmissible cooling down of the leakage flow, for example at standstill or prior to the start of a turbomachine. It has been found that the cooling down of the leakage flow at standstill can have a devastating effect on a dry-gas sliding ring seal during the start-up of a turbomachine.

A turbocompressor which conveys a process gas at a higher system pressure is generally isolated from the process at standstill via blocking valves. The gas enclosed in the compressor now escapes very slowly in a leakage flow through the dry-gas sliding ring seal. As long as the turbocompressor was still running, heat was given off to the leakage flow and to the surroundings by the drag effect of the rotating parts and in the sealing gap of the dry-gas sliding ring seal. In contrast, when the compressor is at a standstill an expansion of the leakage flow takes place, which increasingly leads to a cooling down of the leakage flow and the surroundings the more the process gas deviates from the ideal gas. This effect, named after Joule and Tompson, now has the result that the reservoir of process gas isolated in the turbocompressor cools down substantially with a drop in pressure and that additionally local cooling down takes place in the leakage flow during the expansion to atmospheric pressure. Such a local cooling can have a series of disadvantages. Depending on the purity and composition of the process gas, products can be precipitated out of the leakage flow which impair the operation of the dry-gas sliding ring seals at the next start-up. Even low percentages of water vapor can lead to ice crystals. The strong cooling down in the vicinity of the dry-gas sliding ring seals produces additional mechanical tensions due to the differing coefficients of thermal expansion of the individual components, and secondary seals executed as soft seals lose their elasticity. A start-up of the turbocompressor initiated in this situation increases considerably the risk of damage. The invention lessens the risk by preventing the occurrence of this inadmissible cooling down and the disadvantageous effects resulting therefrom. In turbomachines, which are operated at high system pressures, e.g. over 100 bars, particularly substantial cooling down occurs, which is prevented by the proposed heating device for the leakage flow.

It is especially advantageous to install the heating device before the entry of the leakage flow into the sealing gap of the first dry-gas sliding ring seals and thus to heat up the leakage flow prior to the actual expansion. If the heating device is arranged in ring form in a separate channel around the shaft before the dry-gas sliding ring seals in the housing, a heating possibility is obtained which allows the use of an arbitrary fluid independent of the process gas as a heat carrier for heating the leakage flow. An especially direct action of the heating device arises if the leakage flow is guided across a ring space which borders directly on a ring-shaped heating channel.

The heating device can however also be executed as an electric resistance heater. A ring-shaped heating device can be accommodated both in the inner part of the turbocompressor as well as in the cartridge-like stationary outer part of a dry-gas sliding ring seal. It is evident that, depending on the arrangement of the dry-gas sliding ring seals as a tandem arrangement, as a mirror-image arrangement or as triple arrangement, the heating device will in each case be placed at the most advantageous location for the heat transfer to the leakage flow or can, for example, be doubled up.

In order to preclude overheating in the region of the dry-gas sliding ring seal, the heating temperature in the case of a fluid, or the amount of heat produced in the case of an electric resistance heater, can be limited in such a manner that the heat can easily be dissipated into the surroundings. Another possibility consists in placing a temperature sensor before the entry into the sealing gap of a dry-gas sliding ring seal. This sensor can, on the one hand, switch on the heating device for the leakage flow via a control system when the temperature drops below a prespecified value, and can, on the other hand, also be used to switch off the heating device when a prespecified temperature is exceeded.

The temperature sensor can however also be used as a safety device to prevent start-up of the turbocompressor in order to fundamentally prevent a start-up when the temperature of the leakage flow lies below a given switching value. If the heating device is designed in such a manner that no overheating can occur, it is also sufficient to arrange the control system such that the heating device is switched on during standstill periods.

BRIEF DESCRIPTION OF THE DRAWINGS

FIG. 1 is a schematic view of a turbocompressor which can be isolated from the process via shut-off-valves in the suction and compression lines;

FIG. 2 is a schematic longitudinal section through a turbocompressor in pot construction showing the essential components;

DESCRIPTION OF THE PREFERRED EMBODIMENTS

Figure 3:
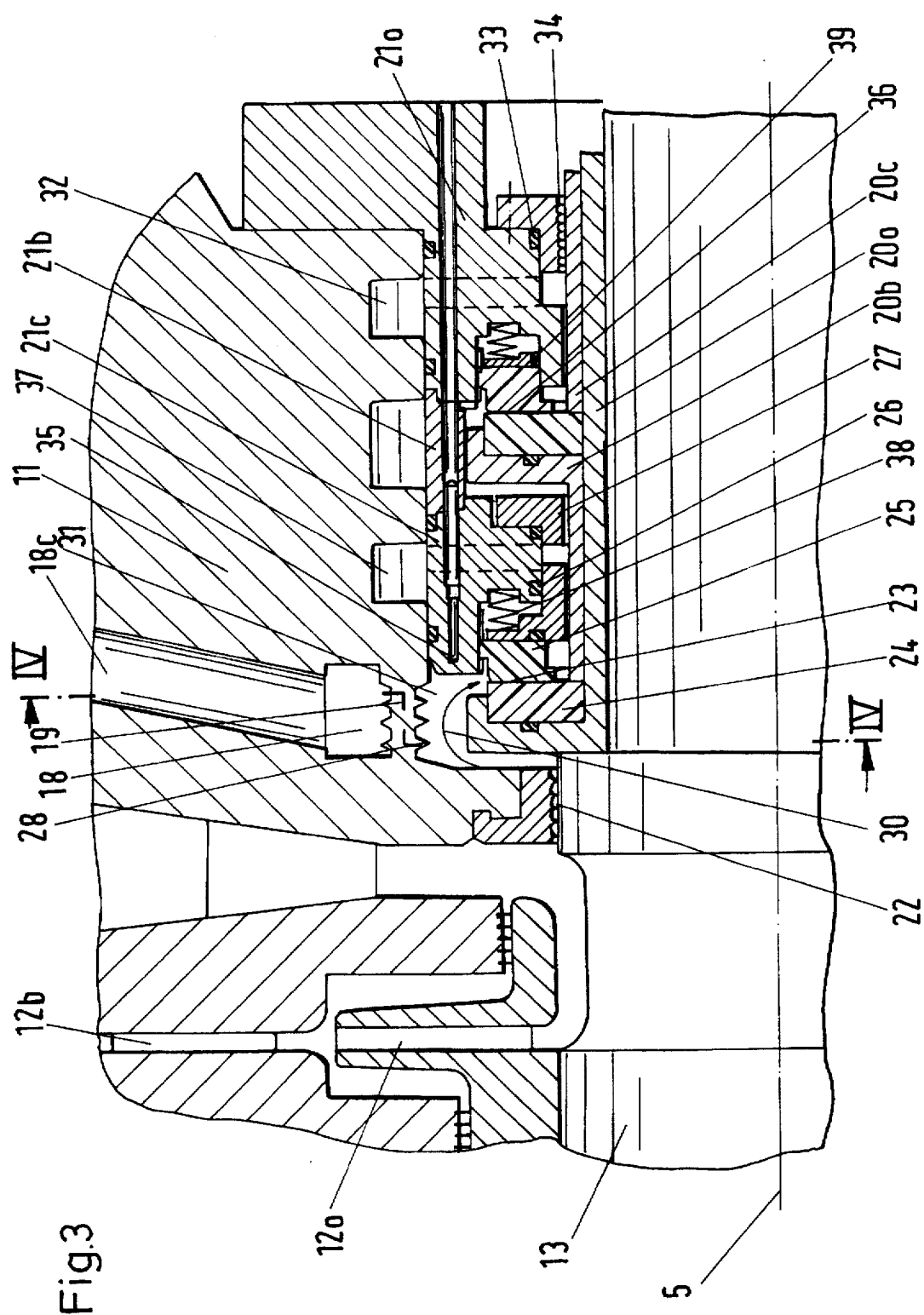
FIG. 3 is an enlarged schematic section from FIG. 2 in the region of the dry-gas sliding ring seal at the suction side.

In the Figures there is shown an arrangement for a dry-gas sliding ring seal in a turbomachine which enables environmental conditions to be created in the region of the dry-gas sliding ring seals under which no liquid precipitates out independently of whether the machine is running or not. Due to the fact that heat is supplied to the leakage flow during standstill of the turbomachine in a manner similar to that during its operation, undercooling in the region of the dry-gas sliding ring seal along with all its negative effects can be suppressed so that the start-up of the turbomachine takes place starting from a substantially safer operating state.

FIG. 1 shows a process diagram of a turbocompressor 1 which is driven at its axle 5 and which compresses the process gas which flows into it through a suction line 4 at a certain system pressure to a higher pressure and conveys it into a pressure line 6. The suction line 4 and the pressure line 6 are each provided with a respective shut-off valve 2, 3 in order to be able to isolate the turbocompressor from the process at standstill. FIG. 2 shows such a turbocompressor as a multi-stage radial compressor of pot-type construction. This type of construction is advantageous above all at high pressures. A housing 10 equipped with a pressure connection 6 and a suction connection 4 is defined by a pressure vessel. An inner part 11, together with the static deflectors, bearing case 7a, 8a, bearings 7, 8 and rotor 13 are pushed into the pressure vessel in the direction of the axis 5 and secured with threaded bolts 17. The rotor 13 is sealed off from the inner part 11 by means of dry-gas sliding ring seals 15, 16. Behind its final stage 14 the rotor 13 has a compensation piston 9 in order to maintain a pressure at the pressure-side dry-gas sliding ring seal 15 similar to that before the first stage 12 and the suction-side dry-gas sliding ring seal. An associated compensation line is not shown here. For the assembly and disassembly the stationary and rotating parts of the dry-gas sliding ring seal 15, 16 are connected together to form a rigid cartridge and pushed from the outside into the inner part 11 and onto the rotor. The connection between the stationary and rotating parts is not shown here. It is removed after the assembly.

Figure 4:
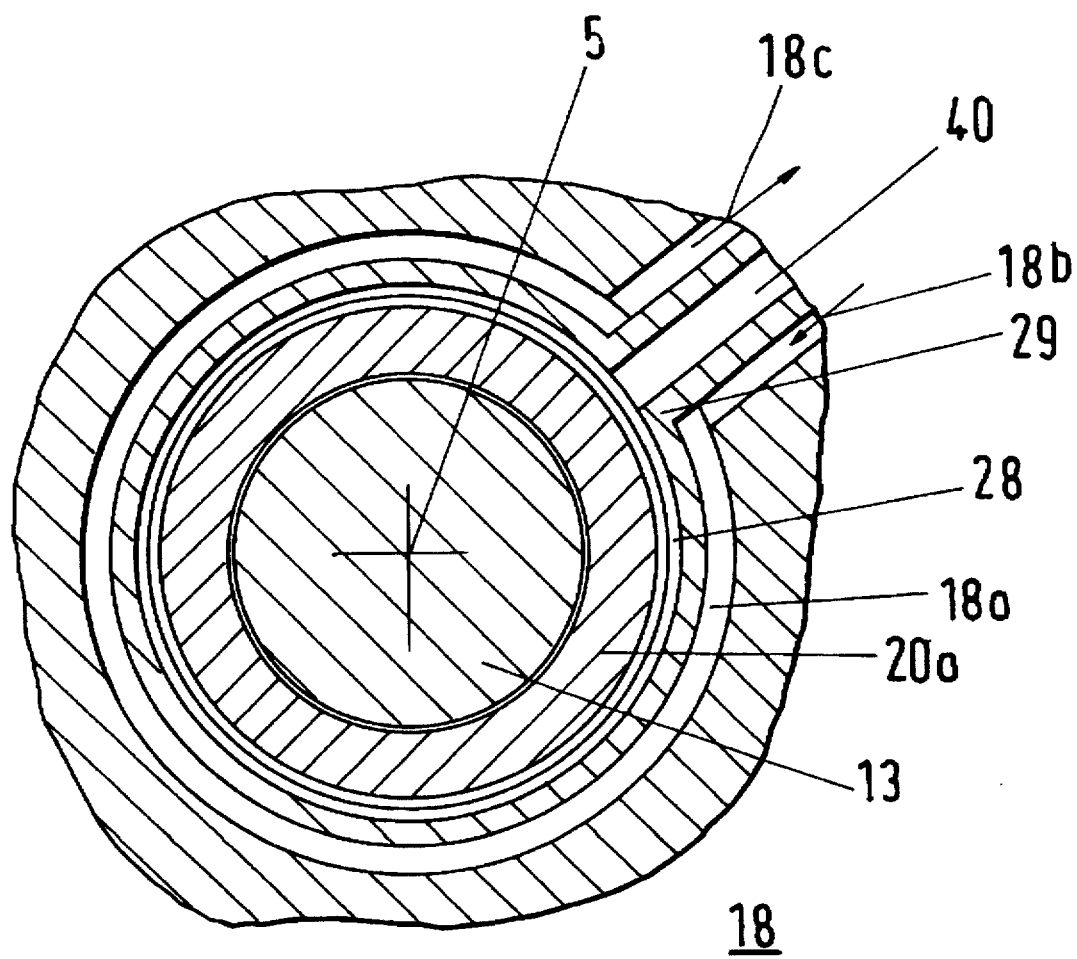
FIG. 4 is a reduced schematic cross-section from FIG. 3 in which a possible embodiment of a heating device is shown.

FIG. 3 shows the suction-side section of a turbocompressor in accordance with the invention. The pumped flow moves past the rotor shaft into the rotor 12a of the first stage and then into a following diffuser 12b. The cover and hub plates of the rotor 12a are sealed off from the stationary part via labyrinths. At standstill a labyrinth 22 first limits the leakage flow 30 in the direction toward the dry-gas sliding ring seal 24, 25. The amount of this leakage flow is however essentially determined by the throughflow in the sealing gap 23 between a ring 24 rotating during operation and a stationary but axially displaceable slide ring 25. During operation a state of equilibrium is established at the slide ring 25 with the help of bracing springs and of soft seals 26, which bring about pressure relief by virtue of their position, a state of equilibrium in which only a low leakage rate and a tolerable heating at the leakage flow are produced. Behind the first dry-gas sliding ring seal 24, 25 the leakage flow divides at a pressure which is already very much closer to atmospheric pressure. A main flow enters into a discharge channel 37 from which it can be returned to the process at a low pressure or, for example, led to a flue for flaring off. A small partial flow passes through a labyrinth 27 to a further dry-gas sliding ring seal with a sealing gap 36, which, for example, is provided as a reserve seal in a tandem arrangement and thus likewise has behind it a discharge channel 32 and a labyrinth 34 to the shaft or to a shaft sleeve 20a. The entire sealing system is executed as a cartridge. The rings 24 rotating along with the shaft are held and caught between shaft sleeves 20a, 20b, 20c. The seal housing consists of an outer seal housing 21a, an intermediate piece 21b and an inner seal housing 21c, which are screwed to one another and which accommodate the axially displaceable slide rings 25 within them. The axial displacement takes place past soft seals 26, 39, whose uniform functioning is enormously important. The remaining soft seals 33 are almost exclusively statically stressed. Before the leakage flow enters the cartridge it passes through a ring space 31 whose outer boundary simultaneously forms a heat conducting separating wall 19 relative to a heating device 18 in the form of a ring-shaped heating chamber 18a (FIG. 4). The separating wall 19 is provided with ribs 28 for a better heat transfer and for enlargement of the exchange area. At standstill of the turbocompressor this heating device 18 can prevent the temperature of the leakage flow from falling substantially below the temperature which occurs in operation, which would represent a danger, above all for non-ideal process gases.

The heating device can also perform a valuable function during operation, namely when blocking gas which is reduced to approximately suction pressure via a restrictor is fed into the space 31 between the labyrinth 22 to the suction channel and the dry-gas sliding ring seal 24, 25. Here, liquid could also precipitate out at too low temperatures, which is prevented by the heating device 18 shown.

As shown in FIG. 4, the ring space 18a is interrupted in the peripheral direction by an intermediate wall 29. A supply line 18b and a removal line 18c for a fluid as heat transporter open at the intermediate wall while a bore 40 is provided in the intermediate wall 29 for feeding in blocking gas.

In FIG. 3 a temperature sensor 35 is built into the inner seal housing and measures the temperature of the leakage flow in the ring space 31 prior to entry into the seal gap 23 of the dry-gas sliding ring seal. The measured signal of this temperature sensor can be used for various purposes. At too low a temperature of the leakage flow during standstill a start-up of the turbocompressor can be fundamentally prevented. Too great a drop in the temperature in the leakage flow can fundamentally cause the heating device to be switched on or, if the heating device is already switched on, regulate the heating temperature to a given desired value by means of a heating regulator. Simplest of all is the situation when a heat carrier independent of the process is present at a suitable temperature and can be switched in at standstill and switched out during operation.

What is claimed is:

1. A turbocompressor for non-ideal process gases comprising a housing, a rotor which is sealed off from the housing via dry-gas sliding ring seals in order to minimize a leakage flow of process gas into a surrounding atmosphere, a heating device mounted at the dry-gas sliding ring seals which prevents an inadmissible cooling down of the leakage flow during standstill and prior to start-up of the turbocompressor, and temperature sensor placed in front of an inlet for the leakage flow into a sealing gap of the dry-gas sliding ring seals for preventing a start-up of the turbocompressor via a control system if a measured temperature lies below a prescribed minimum value.

2. A turbocompressor in accordance with claim 1 wherein the turbocompressor operates at one of a process pressure of at least 100 bars and an ambient temperature below 0°.

3. A turbocompressor in accordance with claim 1 wherein the heating device is formed in a region of the dry-gas sliding ring seals of a closed off ring channel with a supply line and a removal line in order to convey heat to the leakage flow by means of an arbitrary fluid independently of the process gas.

4. A turbocompressor in accordance with claim 1 wherein the heating device is placed in front of a sealing gap of a first dry-gas sliding ring seal as viewed in a direction of the leakage flow in order to heat up the leakage flow sufficiently so that no inadmissible cooling down occurs during an expansion within and after the seal gap.

5. A turbocompressor in accordance with claim 4 wherein prior to reaching the sealing gap the leakage flow traverses a ring space which is surrounded by a heat conducting separating wall of the heating device.

6. A turbocompressor in accordance with claim 1 wherein the heating device comprises an electrical resistance heater.

7. A turbocompressor in accordance with claim 1 wherein the dry-gas sliding ring seals include a housing defined by a cartridge which contains the heating device.

8. A turbocompressor in accordance with claim 1 wherein the temperature sensor switches on the heating device via the control system when the temperature falls below a prescribed desired value.

9. A turbocompressor in accordance with claim 1 wherein the heating device is switched on via the control system when the turbocompressor is switched off.

* * * * *